(No Model.)

R. B. FOWLER.
FLEXIBLE CURTAIN.

No. 462,094. Patented Oct. 27, 1891.

Witnesses
Frederick E. Pollard
Horatio W. H. Lugrin

Inventor
Rufus B. Fowler

United States Patent Office.

RUFUS B. FOWLER, OF WORCESTER, MASSACHUSETTS, ASSIGNOR, BY MESNE ASSIGNMENTS, TO THE LUGRIN FLEXIBLE DOOR COMPANY, OF PORTLAND, MAINE.

FLEXIBLE CURTAIN.

SPECIFICATION forming part of Letters Patent No. 462,094, dated October 27, 1891.

Application filed January 9, 1891. Serial No. 377,284. (No model.)

*To all whom it may concern:*

Be it known that I, RUFUS B. FOWLER, a citizen of the United States, residing at Worcester, in the county of Worcester and State of Massachusetts, have invented a new and useful Improvement in Flexible Curtains, of which the following is a specification, reference being had to the accompanying drawings, forming a part of the same, and in which—

Figure 1:
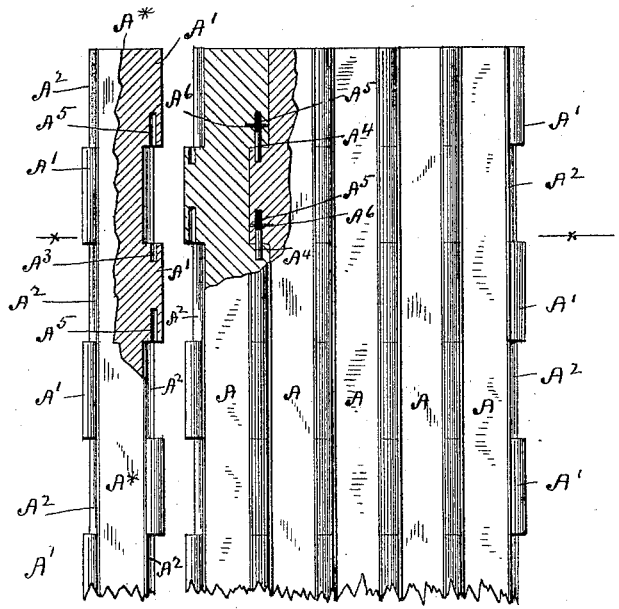
Figure 2:
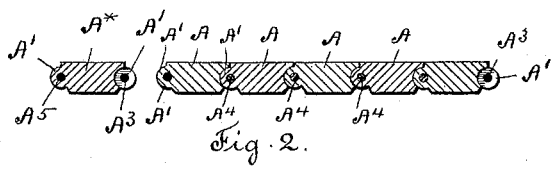

Figure 1 represents a portion of a flexible curtain embodying my invention, one of the bars forming the body of said curtain being shown as detached and certain portions being shown in sectional view, in order to disclose more clearly the method by which the parallel bars forming the body of the curtain are hinged together. Fig. 2 is a sectional view on line $x$ $x$, Fig. 1.

Similar letters refer to similar parts in the different figures.

My present invention relates to certain improvements in the construction of flexible curtains, which are composed of a series of parallel bars hinged together at their edges and especially designed to be used in a vertical position, as a shutter for doors or windows or similar purposes.

In the accompanying drawings, A denotes the parallel bars, which are hinged together to form the curtain. One of said bars $A^*$ is shown as detached from the remaining bars. Upon the opposite edges are formed, preferably integrally with the bar itself, a series of cylindrical barrels $A'$, alternating with spaces $A^2$, in which the edge of the bar is made concave to fit the convex surfaces of the barrels $A'$, each of the spaces $A^2$ being as long as the corresponding barrel $A'$ upon the adjacent bar.

The flexible curtain embodying my invention is intended, when in use, to be maintained in a vertical plane, and I hinge the several bars A, forming the body of the curtain together as follows: In the upper ends of each of the barrels $A'$, I form a concentric hole $A^3$, in which the lower end of the pintle $A^4$ rests, the depth of the hole $A^3$ being about one-half the entire length of the pintle $A^4$. In the lower ends of the barrels $A'$, I form the concentric hole $A^5$, said holes when the bars are brought together being coincident with the holes $A^3$ and being slightly deeper than the length of the pintles $A^4$. In order to hinge the bars A together they are laid in a horizontal position and the pintles $A^4$ are inserted within the holes $A^5$. The bars A are then brought together with the barrels upon the edges of each bar entering the corresponding spaces $A^2$ upon the adjacent bars and bringing the holes $A^5$ and $A^3$ coincident. The bars thus brought together are raised in a vertical position, as represented in Fig. 1, causing the pintles $A^4$ to fall by their own gravity from the holes $A^5$ into the holes $A^3$, bringing one-half of the pintle in each of the opposing ends of the alternate barrels, thereby hinging the bars A together and forming a curtain, which is capable of being extended in a vertical plane in order to close a door or window opening, and also of being rolled into a compact roll inclosed in a pocket at the side of the door or window opening. The holes $A^3$ and $A^5$ are made sufficiently large to allow the pintles to fall readily into the position shown in Fig. 1 as soon as the bars are raised in a vertical position, and the pintles themselves are preferably made of metal, so their weight will aid in carrying them into position, and the pintles $A^4$ are held from sliding by the pins or brads $A^6$ driven into the barrels and through the holes $A^5$.

What I claim as of my invention, and desire to secure by Letters Patent, is—

1. In a flexible curtain adapted to be used in a vertical plane, the combination of a series of parallel bars provided with barrels and intervening spaces by which the edges of said bars are interlocked, said barrels having coincident holes forming chambers in their opposing ends to receive the pintles, the depth of the lower of said holes being less than the length of the pintle and the depth of the upper of said holes being equal to or greater than the length of the pintle, and pintles held in said holes, substantially as described.

2. In a flexible shutter adapted to use in a vertical plane, the combination of a series of parallel bars provided at their edges with interlocking barrels, each opposing pair of said barrels being provided at their ends with coincident and concentric holes to receive the hinging-pintles, one of said holes being of less depth than the length of the pintle and its opposing hole being capable of receiving the pintle entire, and pintles placed loosely in said deeper holes and being capable of sliding by their own gravity into the shallow holes in the opposing barrels as the bars are brought into a vertical position, substantially as described.

3. In a flexible shutter, the combination of a series of parallel bars provided at their edges with interlocking barrels, said barrels having concentric and coincident holes to receive the hinging-pintles, hinging-pintles held loosely in said holes, and pins inserted in said barrels and entering said holes in order to limit the longitudinal movement of said pintles, substantially as described.

Dated the 1st day of January, 1891.

RUFUS B. FOWLER.

Witnesses:
FREDERICK E. POLLARD,
HORATIO N. H. LUGRIN.